United States Patent [19]

Hardin, Jr.

[11] Patent Number: 4,717,531

[45] Date of Patent: Jan. 5, 1988

[54] FUEL TRANSFER SYSTEM UPENDER USING TRANSLATION DRIVE

[75] Inventor: Roy T. Hardin, Jr., Greensburg, Pa.

[73] Assignee: Westinghouse Electric Corp., Pittsburgh, Pa.

[21] Appl. No.: 535,134

[22] Filed: Sep. 23, 1983

[51] Int. Cl.[4] ............................................. G21C 19/18
[52] U.S. Cl. .................................. 376/261; 376/272; 414/381; 414/383
[58] Field of Search ................ 376/262, 264, 268, 261, 376/272; 414/292, 381, 383

[56] References Cited

U.S. PATENT DOCUMENTS

| | | | |
|---|---|---|---|
| 1,280,992 | 10/1918 | Hamilton | 414/381 |
| 1,759,975 | 5/1930 | Conor | 414/381 |
| 3,206,366 | 9/1965 | Bosshard . | |
| 3,637,096 | 12/1972 | Crate . | |
| 4,053,067 | 10/1977 | Katz et al. . | |
| 4,292,133 | 9/1981 | Sasaki et al. . | |

FOREIGN PATENT DOCUMENTS

| | | | |
|---|---|---|---|
| 2836912 | 3/1980 | Fed. Rep. of Germany | 376/262 |
| 2337720 | 8/1977 | France . | |
| 2520150 | 7/1983 | France . | |
| 1148154 | 4/1969 | United Kingdom . | |
| 1528012 | 10/1978 | United Kingdom . | |

Primary Examiner—Deborah L. Kyle
Assistant Examiner—Richard W. Wendtland
Attorney, Agent, or Firm—Daniel C. Abeles

[57] ABSTRACT

A fuel transfer system for a fuel container (26) within a nuclear reactor facility includes a transport car (10) for transporting the fuel container (26) through a transfer tube between a reactor containment handling pool and a spent fuel storage pool. The system includes upending mechanisms for automatically pivoting the fuel container (26) from its horizontal transport mode to its vertical, fuel loading-unloading mode when the fuel container (26) enters one of the pools in response to the translational drive of the transport car (10). The upending mechanisms include slotted brackets (46, 146) mounted upon the fuel container (26), and pivotable pick-up bars (44, 144) for engaging the brackets (46, 146) of the fuel container (26). As the transport car (10) translationally moves past the pick-up bars (44, 144), the brackets (46, 146) of the fuel container (26) engage the bars (44, 144) whereby the latter pivot so as to in turn cause pivotal movement of the fuel container (26) upon the transport car (10) through means of trunnions (28). Reverse translational movement of the transport car (10) causes reverse pivotal movement of the container (26) from the vertical to the horizontal mode and ultimate disengagement of the brackets (46, 146) from the pick-up bars (44, 144).

19 Claims, 6 Drawing Figures

FUEL TRANSFER SYSTEM UPENDER USING TRANSLATION DRIVE

BACKGROUND OF THE INVENTION

1. Field of the Invention:

The present invention relates generally to nuclear reactors, and more particularly to a system for transferring nuclear fuel assemblies between a fuel handling building having a spent fuel storage pool or pit disposed therein, and a reactor handling pool defined within the nuclear reactor containment area.

2. Description of the Prior Art:

The fuel for large nuclear reactors, of the type, for example, employed for generating electrical power, is contained within long, small diameter fuel rods or elements which may vary in length from approximately 12–20 feet. Typically, approximately 225–400 fuel elements are arranged in a predetermined pattern within a fuel assembly, spaces being provided or defined between the fuel elements for the reception of vertically adjustable control rods. Although the number of fuel assemblies disposed within reactors will vary depending upon the size of the reactor and the desired power requirements thereof, a perspective of reactor size may be appreciated from the fact that an 1100 megawatt reactor will in fact contain approximately two hundred fuel assemblies.

When the fuel assemblies are properly disposed within the reactor, and the reactor is rendered operative, the nuclear fission process consumes the fuel within an appreciable period of time thereby necessitating the removal of the old fuel assemblies and the replacement of the same with new fuel assemblies containing fresh fuel. Since the metallic rods and other supporting structures comprising each fuel assembly become radioactive, the operation which effects the replacement of the old fuel assemblies with the new fuel assemblies must be accomplished in an entirely underwater mode so as to avoid any hazards due to the radiation. In addition, since the old fuel elements have been heated to a considerable elevated temperature by means of the nuclear fission process, and will continue to produce substantial amounts of heat from the decay process for a period of at least several months, the old fuel assemblies cannot simply be immediately removed from the plant, but to the contrary, must be stored in an underwater environment which therefore provides radiation protection from, and the necessary cooling of, the fuel assemblies. Conventionally, therefore, each old or spent fuel assembly is removed from the reactor core and transported to a spent fuel storage pool or pit. Subsequently, when the old or spent fuel assemblies have decayed sufficiently, they may be removed from the storage pool or pit and shipped out from the plant for suitable disposal, reprocessing, or other viable disposition processing.

Since it will obviously be imperative that the reactor be operative with its freshly replaced fuel assemblies while the spent fuel assemblies are disposed within the storage pool or pit, the spent fuel storage pit must be located externally of the reactor core and container vessel. Since the reactor container vessel is designed to withstand relatively high pressures, and to provide radiation shielding, it is impractical and uneconomical to provide large transfer-transport openings within the container vessel. Conventionally, therefore, the spent fuel storage pool or pit has been located externally of the reactor containment wall which peripherally surrounds the reactor and defines therewithin the reactor handling pool. Transfer tubes or conduits are disposed within the reactor containment wall and/or the fuel-handling building wall so as to fluidically connect the two pools which are located upon substantially the same elevational level. The elongated fuel assemblies are longitudinally transported in a horizontal mode through the transfer tubes or conduits between the pools as required.

In accomplishing the actual replacement of the old or spent fuel assemblies with fresh fuel assemblies, the fuel assemblies are disposed within fuel carriers or containers, and the latter are transported upon railroad-type cars movable within the transfer tubes or conduits between the two pools. Elevators and/or crane mechanisms are provided for depositing, or withdrawing, the fuel assemblies within, or from, respectively, the fuel carriers or containers in a vertical mode, and in accordance with conventional fuel-handling-transfer systems and techniques, additional means are provided for angularly moving the fuel carriers or containers to or from a horizontal disposition such that the carriers or containers may either be transported upon the railroad cars through the transfer tubes or conduits, or re-oriented in conjunction with the hoisting cranes or elevators.

In particular, one conventional fuel-handling-transfer system comprises a first hydraulic mechanism for pivotably moving, for example, the spent fuel assembly-fuel container assemblage from its vertical mode to a horizontal mode so as to be ready for translational transportation through the transfer tube or conduit upon the railroad-type car transportation system. A second mechanism, which may, for example, take the form of a reversible, electrically driven sprocket-chain drive system, translates the railroad-car vehicle, with the fuel assembly-fuel container assemblage disposed thereon, through the transfer tube and into the spent fuel storage pit or pool, and a third mechanism, which may be substantially the same as the first hydraulic mechanism, pivotably elevates the fuel assembly-fuel container assemblage to its vertical orientation. Transference of fresh fuel assembly-fuel container assemblages is understood to entail substantially the same, but reverse, processing, and this type of conventional system is exemplified by means of U.S. Pat. No. 4,053,067 issued to Leonard R. Katz et al. on Oct. 11, 1977, and assigned to the assignee of the present application, Westinghouse Electric Corporation.

It may thus be appreciated that while such conventional prior art systems obviously operate quite satisfactorily, such systems nevertheless encompass, and require, the provision of three separate, distinct, and diverse drive mechanisms. This exemplary system therefore requires separate control means which is costly to implement, and additionally renders the entire system relatively complex. Still further, processing time is necessarily extensive during the various transfer modes or steps as a result of the discontinuous pivotable and translational movements of the fuel assembly-fuel container assemblages during a transfer mode cycle as accomplished by means of the aforenoted three separate, distinct, and diverse drive mechanisms.

Another conventional fuel-handling-transfer system is disclosed within U.S. Pat. No. 3,637,096 issued to John J. Crate on Dec. 25, 1972 and assigned to Combustion Engineering, Inc. While this patented system admittedly encompasses a system wherein only a single transfer drive mechanism is employed, this conventional system is nevertheless appreciated to be costly to implement in view of the necessity of providing the extensive guide rail system for cooperating with the fuel carrier guide rollers.

Accordingly, it is an object of the present invention to provide a new and improved nuclear reactor fuel transfer system.

Another object of the present invention is to provide a new and improved nuclear reactor fuel transfer system for transferring nuclear reactor fuel assemblies between a fuel handling building and its spent fuel storage pool or pit, and the nuclear reactor containment area and its reactor handling pool.

Still another object of the present invention is to provide a new and improved nuclear reactor fuel assembly transfer system which overcomes the various disadvantages of the known prior art conventional systems.

Yet another object of the present invention is to provide a new and improved nuclear reactor fuel assembly transfer system which eliminates the requirement for multiple drive means in order to achieve the various transfer orientation modes of the fuel assembly-fuel container assemblages during a transfer process between the spent fuel storage and reactor handling pools.

Still yet another object of the present invention is to provide a new and improved nuclear reactor fuel assembly transfer system which is substantially more simplified than conventional nuclear reactor fuel assembly transfer systems.

Yet still another object of the present invention is to provide a new and improved nuclear reactor fuel assembly transfer system which accomplishes a substantial reduction in the number of drive systems required within the overall fuel assembly transfer system so as to effectively reduce the maintenance costs of the transfer system.

A further object of the present invention is to provide a new and improved nuclear reactor fuel assembly transfer system which effectively reduces the requisite space requirements of the overall fuel assembly transfer system by eliminating the multiple drive system characteristic of conventional fuel assembly transfer systems and replacing the same with a single drive mechanism fuel assembly transfer system.

A yet further object of the present invention is to provide a new and improved nuclear reactor fuel assembly transfer system which is substantially more cost-effective to implement than conventional systems in that the initial construction costs and investment required is substantially less than that of comparable conventional systems in light of the elimination of the multiple drive systems characteristic of the prior art.

DISCLOSURE OF THE INVENTION

The foregoing and the other objectives of the present invention are achieved through the provision of a nuclear reactor fuel assembly transfer system which comprises a single power source drive mechanism or system for achieving both the pivotable rotation of the fuel assembly-fuel container assemblage between its vertical and horizontal modes, as required at the extreme ends of the assemblage's translational transportation movement, as well as the aforenoted longitudinal translational movement of the fuel assembly-fuel container assemblage through the nuclear reactor plant transfer tube or conduit interposed between the reactor containment handling and spent fuel storage pools.

In accordance with a first embodiment of the present invention, the fuel container, within which a fuel assembly is disposed, is pivotably mounted upon the railroad-type transport car by means of suitable trunnion devices, and the upper and lower surfaces of the fuel container are provided with upender brackets. The brackets are disposed upstream of the trunnions as viewed in the direction of translational travel of the transport car and the fuel assembly-fuel container assemblage, and slots are defined within the brackets. Upender arm mechanisms, having pick-up bars for engaging the slots of the fuel container brackets, are pivotably disposed within the reactor containment handling and spent fuel storage pools at sufficient distances from the ends of the transfer tube or conduit so as to permit pivotable movement of the fuel assembly-fuel container assemblage without any interference between the trailing end of the fuel container and the transfer tube or conduit.

The drive system for the railroad-type transport car and the fuel assembly-fuel container assemblage is conventionally an electrically powered, cable or chain-driven sprocket system, however, this single drive system performs both the aforenoted pivotable rotation of the fuel assembly-fuel container assemblage between its vertical and horizontal modes, and the translational transportation of the fuel assembly-fuel container-railroad car assemblage through the plant transfer tube or conduit. In particular, for example, when a fuel assembly-fuel container assemblage is being translationally transported by means of the railroad car through the plant transfer tube or conduit between the reactor containment handling pool and the spent fuel storage pool, that is, the assemblage is proceeding toward the spent fuel storage pool, as the fuel assemblage emerges from the transfer tube or conduit, the upper upender brackets will engage the upender pick-up bars whereby, under the influence of the translational movement of the railroad car-fuel assemblage, the upender arm mechanism will be caused to pivot upwardly thereby automatically causing pivotable re-orientation of the fuel assembly-fuel container assemblage from its horizontal mode to its vertical mode. The fuel assemblage is of course nevertheless still supported upon the railroad transport car through means of the trunnion devices. At this stage, the fuel assembly is ready to be removed from the fuel container by means of suitable elevator or hoist-crane apparatus.

In a similar manner, when the fuel assemblage is being translationally transported by means of the railroad-type car through the plant transfer tube or conduit from the spent fuel storage pool within the fuel handling building to the reactor containment handling pool, new or fresh fuel is initially deposited within the vertically oriented fuel container, and subsequently, the railroad car transport system is activated. Translational movement of the railroad car in the opposite direction toward the reactor containment handling pool initially causes automatic re-orientation of the fuel assemblage from its vertical mode to its horizontal mode by means of the reverse pivotal movement of the upender arm mechanism, followed by disengagement of the upper fuel container brackets from the upender arm pick-up bars. Continued translational movement of the railroad car and fuel assemblage toward the reactor containment handling pool, and through the transfer tube or conduit, causes engagement of the lower fuel container brackets with the pick-up bars of the upender mechanism disposed within the reactor containment handling pool after the brackets have emerged from the plant transfer tube. The translational movement of the transport car-fuel assemblage causes the downward pivotable movement of the reactor pool upender mechanism whereby the fuel assemblage is automatically re-oriented from its horizontal mode to its vertical mode. The new or fresh fuel assembly is then ready to be removed from the fuel container by means of suitable elevator or hoist-crane apparatus for deposition within the reactor.

In accordance with a second embodiment of the present invention, in lieu of the upender brackets being disposed atop and beneath the fuel container, the brackets may be fixedly secured to the sides of the fuel container, and the upender arm mechanisms are accordingly provided with inwardly projecting pick-up bars for engaging the slotted brackets mounted upon the sides of the fuel container.

Thus, it may be appreciated that the nuclear reactor fuel assembly transfer system of the present invention provides a simple means for automatically transferring fuel assemblies between the reactor handling containment and spent fuel storage pools, through means of the requisite pivotable and translational transport modes including both vertical and horizontal dispositions of the fuel assembly-fuel container assemblages, under the influence of a single translational transport drive means or system.

BRIEF DESCRIPTION OF THE DRAWINGS

Various other objects, features, and attendant advantages of the present invention will be more fully appreciated as the same becomes better understood from the following detailed description when considered in conjunction with the accompanying drawings, in which like reference characters designate like or corresponding parts throughout the several views, and wherein.

DESCRIPTION OF THE PREFERRED EMBODIMENT

Figure 1:
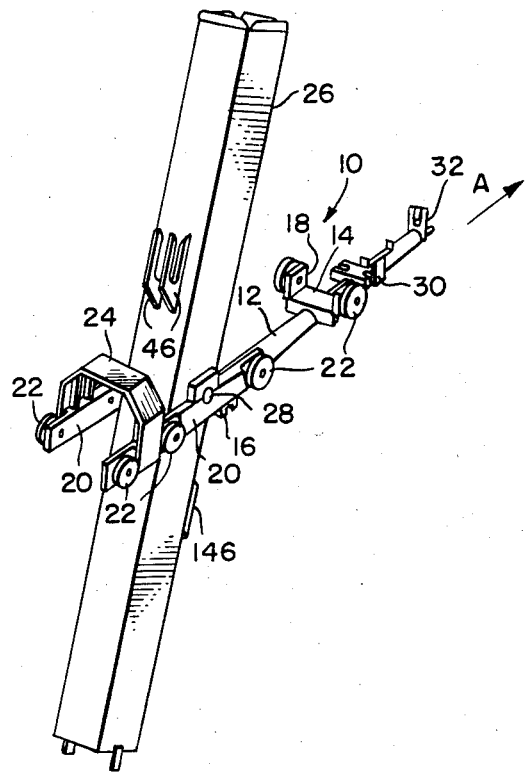
FIG. 1 is a perspective view of a railroad-type transport car-fuel container assemblage utilized within the nuclear reactor fuel assembly transfer system of the present invention.

Referring now to the drawings, and more particularly to FIG. 1 thereof, there is shown a railroad-type transport car, generally designated by the reference character 10, which is employed in a conventional manner within the nuclear reactor fuel assembly transfer system of the present invention. The transport car 10 comprises a primary, longitudinally extending, central support beam member 12 to which are fixedly secured, such as, for example, by welding or the like, at least two, longitudinally spaced, transversely extending secondary crossbeam members 14 and 16. For the purposes of this discussion, forward movement of the transport car 10, as designated by the arrow A, is considered to be in the direction leading from the reactor containment handling pool, not shown, to the spent fuel storage pool, also not shown. In this context, it is seen that the forward crossbeam 14 is fixedly secured to the upper surface of the central beam member 12 at an axial position intermediate the ends of beam 12, while the rearward crossbeam 16 is fixedly secured to the undersurface of the central beam member 12 at the trailing end thereof.

Forward crossbeam 14 has upstanding, square-shaped plates 18 fixedly secured to the opposite ends thereof, while rearward crossbeam 16 has rearwardly extending, elongated plates 20 similarly fixedly secured to the opposite ends thereof. Each of the plates 18 serves as a mounting frame for a railroad-type wheel 22, while each of the substantially rectangularly shaped plates 20 serves as a mounting frame for a plurality of longitudinally spaced wheels 22. In this manner, transportation of car 10 along rails or tracks, not shown, disposed within the plant transfer tube or conduit, the reactor containment handling pool, and the spent fuel storage pool, all of which is also not shown but conventionally well-known, is facilitated. An upwardly extending, arch-shaped tie beam 24 is also provided to connect the rear ends of the car plates 20 together in order to provide the rear end of the car with the requisite amount of lateral structural rigidity.

A fuel container 26, having a configuration of a substantially rectangular parallelopiped which is square in transverse cross-section, is pivotably mounted upon the transport car 10 by means of trunnions 28. The trunnions 28 are fixedly secured atop the side car plates 20 at an axial position interposed between the forwardmost set of wheels 22 mounted upon plates 20 and the rear sets of wheels 22 plates 20. In this manner, the fuel container 26 is able to be pivotably moved between its vertical or upended position at the extreme ends of its transportation travel path, and its horizontal position characteristic of its transportation through the plant transfer tube or conduit, not shown. It is noted that when the fuel container 26, which of course will contain either spent or fresh fuel assemblies during a transportation mode through the plant transfer tube or conduit between the reactor containment handling pool and the spent fuel storage pool, is disposed in its horizontal mode or disposition, the forward end of the container 26 is effectively laterally confined by means of a cradle defined by means of the forward crossbeam 14 and the upstanding wheel frames 18. In addition, a suitable latch mechanism 30 may be secured upon the forward end of central support beam 12 for retaining the fuel container 26 in its horizontal transport mode, however, for the purpose of this patent application and the present invention embodied herein, this latch mechanism 30 forms no part of the present invention.

Lastly, it will be appreciated that, as viewed in FIG. 1, the lower end of the fuel container 26 is of course closed in order to retain the fuel assemblies, therein not shown, when the fuel assemblies are loaded into the fuel container 26 through means of the open upper end of the container by suitable crane or elevator apparatus, also not shown. When the fuel container 26 is then pivotably moved to its horizontal mode for transportation through the plant transfer tube or conduit, it is desired to effectively close the upper or forward end of the container 26 so as to prevent any inadvertent or undesired axial movement of the fuel assemblies out of the fuel container 26 in response to any axial loads which may possibly be impressed upon the fuel container-fuel assemblies assemblage during the horizontal transfer mode. In this regard, an upstanding fuel assembly retainer plate 32 is fixedly secured to the forward end of the transport car central beam 12 so as to effectively cover the open forward end of the fuel container 26 as the same is pivotably moved downwardly from its vertical upended, fuel load-unload mode to its horizontal transportation mode.

Figure 2:
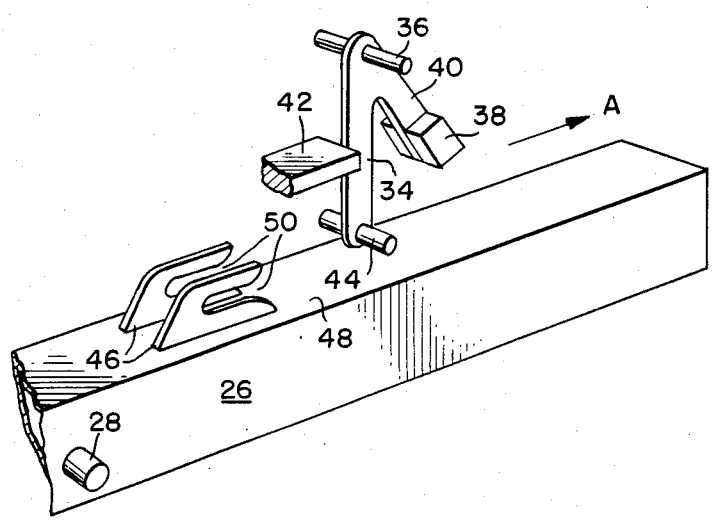
FIG. 2 is a perspective, detailed view of a portion of the fuel container of FIG. 1 operatively associated with the upender mechanism, of the nuclear reactor fuel assembly transfer system of the present invention, disposed within the spent fuel storage pool.

In accordance with the present invention, there are provided upending mechanisms disposed within the reactor containment handling and spent fuel storage pools for automatically pivoting the fuel container 26 and its associated fuel assemblies between the aforenoted vertical loading-unloading and horizontal transport modes in response to the translational movement of the fuel container-fuel assemblies-transport car assemblage. With particular reference now being made to FIG. 2 of the drawings, the upending mechanism and system disposed within the spent fuel storage pool is shown as including an upender arm 34. Arm 34 is pivotably mounted upon a pivot rod 36 which is fixedly secured within the spent fuel storage pool by suitable means, not shown. A counterweight 38 is fixedly mounted upon a counterweight arm 40 which is integrally secured to the arm 34 so as to define an acute angle therewith, the counterweight 38 being disposed forwardly of the upender arm 34 as viewed in the forward direction of travel of the fuel container as designated by the arrow A. A horizontally disposed stop plate 42 is fixedly secured within the storage pool at a location rearwardly of upender arm 34, and consequently, under the weighted action of counterweight 38, upender arm 34 is normally vertically disposed against stop plate 42.

Upender arm 34 extends downwardly beneath the level of stop plate 42, and the lower end of upender arm 34 is provided with a transversely extending bar 44 such that its ends project laterally outwardly from the plane of upender arm 34. The upender mechanism is disposed at an elevational level above the plane of horizontal travel of the fuel container 26 when the same is disposed within its horizontal transportation mode or orientation. A pair of brackets 46 are fixedly secured to the upper surface 48 of fuel container 26 at an axial or longitudinal location which is forwardly of the trunnions 28. Each of the brackets 46 is provided with a forwardly extending open slot 50 which is disposed at an elevational level matching that of the upender bar 44. In this manner, as the fuel container emerges from the plant transfer tube or conduit and is transported into the spent fuel storage pool, the fuel container slotted brackets 46 will engage the ends of upender arm bar 44 and be caused to automatically pivot upwardly from its horizontal transport mode to its vertical unload-load mode.

Figure 3:
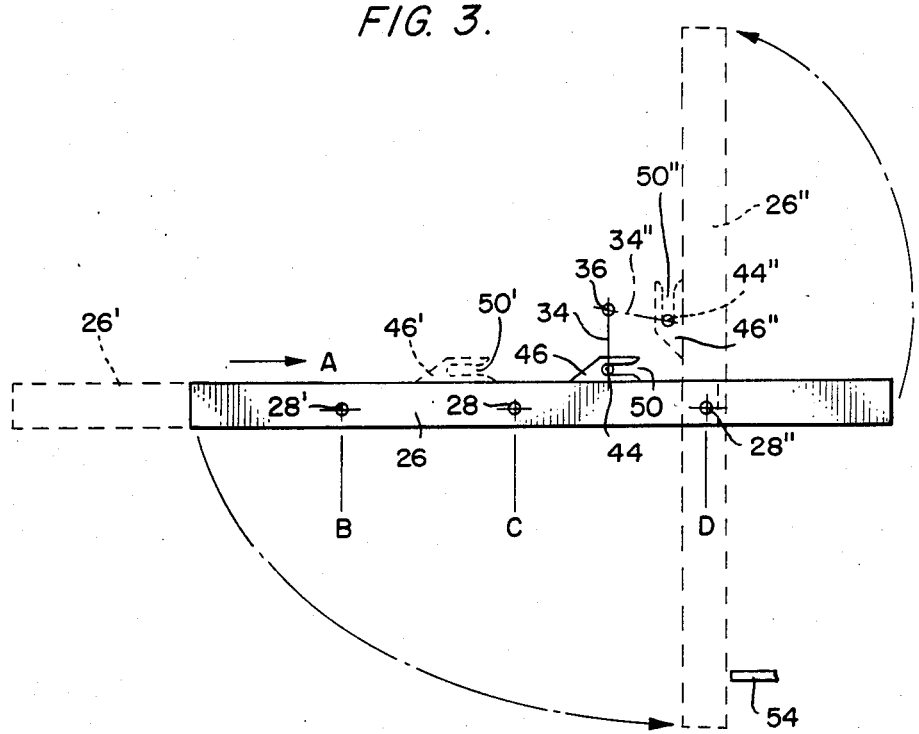
FIG. 3 is a schematic drawing of the operative interaction which occurs between the fuel container of FIGS. 1 and 2 and the upender mechanism of FIG. 2 as the fuel container emerges from the plant transfer tube or conduit and approaches the end of its translational transportation movement into the spent fuel storage pool.

This last-mentioned operational sequence may be appreciated with reference being made to FIG. 3 of the drawings wherein such movement of the fuel container 26, as caused by the upending system of the present invention, is schematically illustrated. As the fuel container proceeds from the reactor containment handling pool toward the spent fuel storage pool in its horizontal transportation mode, and in the direction of movement as designated by the arrow A, the fuel container will emerge from the plant transfer tube or conduit and approach the upender mechanism disposed within the spent fuel storage pool. In FIG. 3, the upender mechanism is schematically illustrated as including the upender pivot rod 36 and upender pick-up bar 44. The fuel container 26 is illustrated in various positions relative to the upender mechanism as exemplified, for example, by its approach position B wherein the fuel container trunnions are noted as 28'. When the fuel container is at such relative position, the fuel container upender brackets 46' are still upstream of the upender pick-up bar 44. As the fuel container 26 continues to approach the upender mechanism and the pick-up bar 44, engagement is made between the fuel container brackets 46 and the pick-up bar 44 when the fuel container trunnions are at station or position C. Continued horizontal translational movement of the railroad transport car 10 causes the corresponding translational movement of the fuel container 26 in the direction of arrow A and as illustrated by the illustrative location of the fuel container trunnions 28" at station or position D, however, as a result of the engagement of the fuel container brackets 46 with the upender pick-up bar 44, the upender arm 34, upender pick-up bar 44, fuel container 26, and fuel container brackets 46 are automatically caused to move to their upended positions denoted respectively at 34''', 44''', 26'', and 46''. In effect, then, by means of the present invention upending system, the fuel container is automatically caused to move, by means of the single translational movement of the railroad transport car 10, simultaneously through both translational and pivotable movements at the end of its travel path within the spent fuel storage pool. A horizontally disposed stop plate 54, similar to stop plate 42, is located within the lower depths of the spent fuel storage pool so as to arrest the pivotable movement of the trailing end of the fuel container 26'' and thereby orient the same in its vertical mode whereby the container 26'' is now made ready for its spent fuel unloading-fresh fuel loading operations by means of the suitable elevator or crane apparatus, not shown. Suitable stop means, also not shown, are provided immediately downstream of the end of the railroad rails or tracks for similarly arresting the translational movement of the transport car at the position or station D of trunnions 28''.

It is of course to be appreciated that the upending mechanism of the present invention is located within the spent fuel storage pool at a sufficient distance downstream from the end of the plant transfer tube or conduit extending into the spent fuel storage pool so as to in fact permit the clearance of the fuel container 26 beyond the transfer tube terminal end whereby the pivotable upending movement of the fuel container 26 may in fact be achieved. Furthermore, it is to be noted that the counterweight mechanism 38 serves the additionally desired function of maintaining engagement between the upender pick-up bar 44 and the fuel container brackets 46. If it is found in practice that this counterweighted force is required to be supplemented, suitable spring mechanisms, not shown, may be incorporated within the upender arm system so as to tend to bias the same still further toward its normally vertical mode as illustrated within FIG. 2.

Another feature to be appreciated from the present invention system is that the trunnions 28 of the fuel container 26 are disposed rearwardly of the center of the fuel container as viewed along the axial length thereof. In this manner, the center of gravity is disposed to the right, or downstream, of the trunnions 28 of the fuel container as viewed, for example, in FIG. 3. As a result of this particular mounting of the fuel container upon the transport car 10, the fuel container 26 will tend to assume its horizontal transportation mode. This enhances the stability of the system, and acts in conjunction with the counterweight forces impressed upon the upending mechanism by means of counterweight 38. These forces become particularly active when the fuel container is caused to move from its vertical mode illustrated at 26" in FIG. 3 to its horizontal transport mode 26 upon completion of a fresh-fuel loading operation, and the commencement of a transport mode from the spent fuel storage pool toward the reactor containment handling pool. During the initial movement of the fuel container from its vertical mode 26" to its horizontal transport mode 26, it will of course be appreciated that the upending system of the present invention operates in precisely the same manner as described hereinabove, except in reverse, with disengagement of the upender pick-up bar 44 and the fuel container brackets 46 being achieved when the fuel container trunnions are located at station C.

Figure 4:
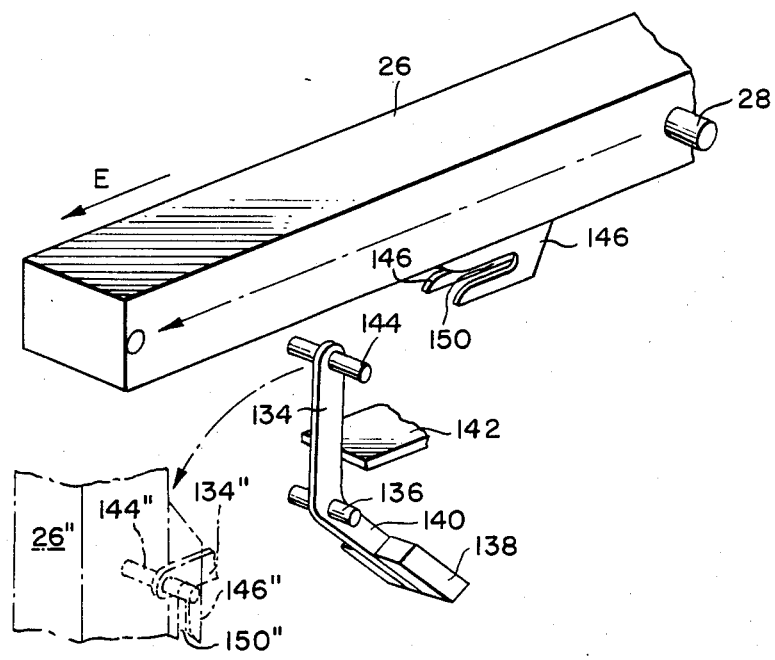
FIG. 4 is a view similar to that of FIG. 2, showing, however, the fuel container of FIG. 1 operatively associated with the upender mechanism, of the nuclear reactor fuel assembly transfer system of the present invention, disposed within the reactor handling pool.

As has been briefly alluded to hereinbefore in connection with the general operation of the fuel transfer system characteristic of a nuclear plant, upending means must likewise be provided within the reactor containment handling pool of the plant, and in accordance with the present invention, such means is illustrated within FIG. 4. This system is operationally similar, but somewhat reversed, with respect to the upending system employed within the spent fuel storage pool, and is seen to include a pair of brackets 146 fixedly secured to the underside of fuel container 26. The brackets 146 are disposed forwardly of the fuel container trunnions 28, as considered in view of the relative direction of travel of the fuel container from the spent fuel storage pool to the reactor containment handling pool as designated by the arrow E, and include forwardly open slots 150.

An upending mechanism is disposed within the reactor containment handling pool, and is seen to comprise an upender arm 134 pivotably mounted upon a pivot rod 136 which is fixedly secured within the reactor containment handling pool by suitable means, not shown. A counterweight 138 is fixedly mounted upon a counterweight arm 140 which is integrally formed with upender arm 134 so as to define therewith an obtuse angle such that the counterweight 138 is disposed below and rearwardly of upender arm 134. A horizontally disposed stop plate 142 is fixedly secured within the reactor containment handling pool at a location rearwardly of upender arm 134, and consequently, under the force of counterweight 138, the upender arm 134 is normally disposed vertically against stop plate 142.

The upender arm 134 extends vertically above stop plate 142, and the upper end of arm 134 is provided with a transversely extending bar 144 such that its ends project laterally outwardly from the plane of arm 134. The upender mechanism is disposed at an elevational level below the plane of horizontal translational movement of the fuel container 26 so as not to interfere with the transportation thereof into the reactor containment handling pool, however, the upender pick-up bar 144 is disposed at an elevational level which matches that of the bracket slots 150 so as to operationally engage the same. In this manner, as the fuel container 26 emerges from the plant transfer tube or conduit into the reactor containment handling pool, the upending mechanism within the containment pool will automatically cause the leading end of the fuel container 26 to be pivoted downwardly whereby the fuel container 26 is ultimately re-oriented to its vertical fresh fuel unloading mode.

Figure 5:
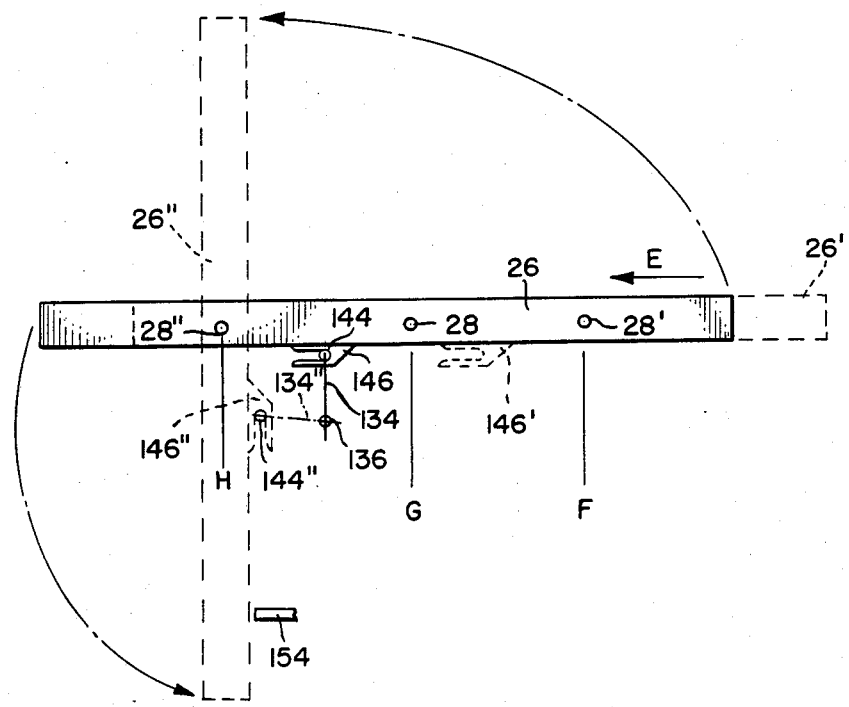
FIG. 5 is a view similar to that of FIG. 3, showing, however, the operative interaction which occurs between the fuel container of FIGS. 1 and 4 and the upender mechanism of FIG. 4 as the fuel container emerges from the plant transfer tube or conduit and approaches the end of its translational transportation movement into the reactor handling pool.

This last-mentioned operational sequence may be appreciated from reference being made to FIG. 5 of the drawings wherein such movement of the fuel container 26, and the interaction with the upending mechanism within the reactor containment pool, is schematically illustrated. As the fuel container proceeds in its horizontal transport mode through the plant transfer tube or conduit and emerges from the same, the container 26 will enter the containment pool and approach the upending mechanism illustrated within FIG. 4. In FIG. 5, the upending mechanism of FIG. 4 is schematically illustrated as including the upender pivot rod 136 and the upender pick-up bar 144. The fuel container 26 is illustrated in various positions relative to the upender mechanism as exemplified, for example, by its approach position F wherein the fuel container trunnions are noted as 28'. When the fuel container 26' is at such relative position, the fuel container upender brackets 146' are still upstream of the upender pick-up bar 144. As the fuel container 26 continues to approach the upender mechanism and the pick-up bar 144, engagement is made between the fuel container brackets 146 and the pick-up bar 144 when the fuel container trunnions 28 are disposed at station or position C. Continued horizontal translational movement of the railroad transport car 10 causes the corresponding translational movement of the fuel container 26 in the direction of arrow E and as illustrated by the location of the fuel container trunnions 28" at station or position D. However, as a result of the engagement of the fuel container brackets 146 with the upender pick-up bar 144, the upender arm 134, upender pick-up bar 144, fuel container 26, and fuel container brackets 146 are automatically caused to be pivoted downwardly so as to achieve their upended positions 134", 144", 26", and 146", respectively. A horizontally disposed stop plate 154 is located within the lower depths of the reactor containment handling pool so as to arrest the downwardly pivotable movement of the leading end of the fuel container 26" and thereby orient the same in its vertical mode whereby the container 26" is now made ready for its fresh fuel unloading-spent fuel loading by means of suitable elevator or crane apparatus, not shown. Suitable stop means, also not shown, is also provided immediately downstream of the end of the railroad rails or tracks within the containment pool for similarly arresting the translational movement of the transport car corresponding to the position or station D of trunnions 28". It is to be noted at this juncture that the aforenoted relative disposition of the trunnions 28 and the center of gravity of the fuel container likewise enhances the operational stability of the system within the reactor containment handling pool as such was characteristic of the operational modes within the spent fuel storage pool.

Figure 6:
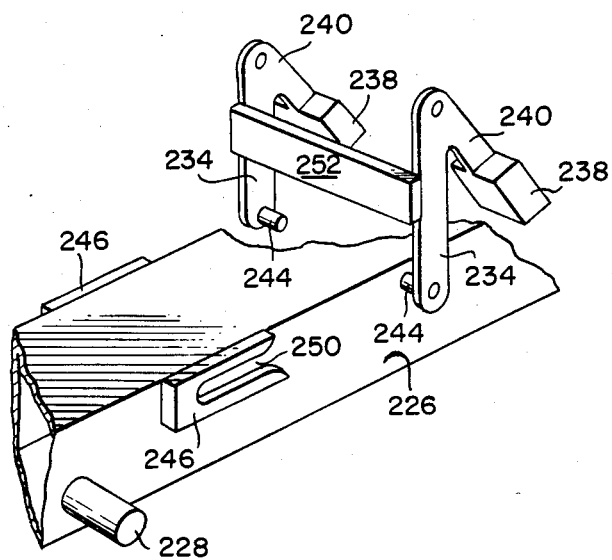
FIG. 6 is a view similar to that of FIG. 2, showing, however, a second embodiment of the fuel container, and its operatively associated upender mechanism disposed within the spent fuel storage pool.

Referring now to FIG. 6 of the drawings, a second, modified arrangement of the upending system of the present invention is disclosed. While the system of FIG. 6 is similar to that of FIG. 2 so as to be employed within the spent fuel storage pool of the fuel handling building, another system similar to that of FIG. 6 yet modified in accordance with the operational orientation of the system of FIG. 4, may likewise be provided so as to be capable of being employed within the reactor containment pool. As seen in FIG. 6, in lieu of the single dependent upender arm 34 of the embodiment of FIG. 2, the system of FIG. 6 employs a pair of laterally spaced dependent upender arms 234. In addition, in lieu of the single laterally outwardly projecting pick-up bar 44 of the system of FIG. 2, each arm 234 is provided at its lower end with a laterally inwardly projecting pick-up bar 244. The arms 234 are pivotally supported by suitable pivot rods, not shown, and are connected together by means of a transversely extending support bar 252. A pair of counterweights 238 are respectively operatively associated with each upender arm 234 through means of counterweight arms 240 integrally formed with the upender arms 234. Another modification of the system of FIG. 2 as embodied within the system of FIG. 6 resides in the disposition of the upender fuel container brackets 246 upon the sidewalls of the fuel container 226 as opposed to the same being disposed upon the upper and lower surfaces of the container. The brackets 246 are of course still provided with forwardly open slots 250 whereby the brackets 246 can operatively engage the upender pick-up bars 244.

Obviously, many modifications and variations of the present invention are possible in light of the above teachings. It is therefore to be understood that within the scope of the appended claims, the present invention may be practiced otherwise than as specifically described herein.

I claim:

1. An article transport system, comprising:
    means for moving said article from a first location toward a second location substantially within a first plane;
    means for driving said moving means within said first plane; and
    pivotable means fixedly disposed within the vicinity of said second location for automatically moving said article from said first plane into a second plane in response to said driven movement of said moving means within said first plane.

2. An article transport system as set forth in claim 1, further comprising:
    means upon said article for engaging said pivotable means.

3. An article transport system as set forth in claim 1, wherein:
    said moving means comprises a railroad transport car; and
    said article is a nuclear reactor fuel container pivotably mounted upon said transport car.

4. An article transport system as set forth in claim 3, wherein:
    said first plane is a horizontal plane; and
    said second plane is a vertical plane.

5. An article transport system as set forth in claim 4, wherein;
    the center of gravity of said fuel container is located relative to the pivotable axis of said fuel container so as to bias said fuel container toward said horizontal plane.

6. An article transport system, comprising:
    means for moving said article between a first location substantially with a first plane;
    means for driving said moving means within said first plane;
    pivotable means fixedly disposed within the vicinity of said first location for automatically moving said article from said first plane into a second plane in response to said driven movement of said moving means within said first plane when said article is being transported from said second location to said first location; and
    pivotable means fixedly disposed within the vicinity of said second location for automatically moving said article from said first plane into a second plane in response to said driven movement of said moving means within said first plane when said article is being transported from said first location to said second location.

7. An article transport system as set forth in claim 6 wherein:
    said first plane is a horizontal plane; and
    said second plane is a vertical plane.

8. A transport system for use within a nuclear facility for transferring fuel containers through a transfer tube or conduit between a reactor containment handling pool and a spent fuel storage pool, comprising:
    means for moving said fuel container between said reactor containment handling pool and said spent fuel storage pool substantially within a first plane;
    means for driving said moving means within said first plane;
    pivotable first means fixedly disposed within said reactor containment handling pool for automatically moving said container from said first plane into a second plane in response to said driven movement of said moving means within said first plane when said fuel container is being transported from said spent fuel storage pool into said reactor container handling pool; and
    pivotable second means fixedly disposed within said spent fuel storage pool for automatically moving said container from said first plane into a second plane in response to said driven movement of said moving means within said first plane when said fuel container is being transported from said reactor containment handling pool into said spent fuel storage pool.

9. A transport system as set forth in claim 8, wherein:
    said first plane is a horizontal plane within which said transport tube is disposed;
    said second plane is a vertical plane within which said fuel container is disposed for unloading spent fuel and loading fresh fuel when said fuel container is located within said spent fuel storage pool; and
    said second plane is a vertical plane within which said fuel container is disposed for unloading fresh fuel and loading spent fuel when said fuel container is located within said reactor containment handling pool.

10. A transport system as set forth in claim 8, further comprising:

stop means disposed within said reactor containment handling and spent fuel storage pools for limiting the movement of said fuel container from said first plane to said second plane.

11. An article transport system, comprising:

means for moving said article from a first location toward a second location substantially within a first plane;

means for driving said moving means within said first plane;

pivotable bar means fixedly disposed within the vicinity of said second location for automatically moving said article from said first plane to a second plane in response to said driven movement of said moving means within said first plane; and slotted bracket means upon said article for engaging said pivotable bar means.

12. An article transport system as set forth in claim 11, wherein:

said pivotable means is dependently supported at an elevational level disposed above said first plane of movement of said article; and said article engaging brackets are secured upon an upper surface portion of said article.

13. An article transport system as set forth in claim 11, wherein:

said pivotable means is upstandingly supported at an elevational level disposed below said first plane of movement of said article; and said article engaging brackets are secured upon an undersurface portion of said article.

14. An article transport system as set forth in claim 11, further comprising:

means for biasing said pivotable means toward its initial position for engagement with said bracket means.

15. An article transport system as set forth in claim 14, wherein:

said biasing means comprises counterweight means.

16. An article transport system as set forth in claim 11, wherein:

said pivotable means comprises an arm, and said bar means comprises a pair of bars projecting laterally outwardly from said arm; and said bracket means, comprises a pair of laterally spaced slotted brackets for engaging said pair of bars.

17. An article transport system as set forth in claim 11, wherein:

said pivotable means comprises a pair of laterally spaced arms, and said bar means comprises a laterally spaced pair of bars respectively mounted upon said pair of arms and projecting laterally inwardly toward each other; and said bracket means comprises a pair of laterally spaced slotted brackets for engaging said pair of bars.

18. An article transport system as set forth in claim 17, wherein:

said brackets are disposed upon side surfaces of said article.

19. An article transport system as set forth in claim 14, further comprising:

stop means for defining said initial position of said pivotable means for engagement with said bracket means.

* * * * *